(12) United States Patent
Ragan, Jr. et al.

(10) Patent No.: US 11,036,806 B2
(45) Date of Patent: Jun. 15, 2021

(54) SEARCH EXPLORATION USING DRAG AND DROP

(71) Applicant: INTERNATIONAL BUSINESS MACHINES CORPORATION, Armonk, NY (US)

(72) Inventors: Richard W. Ragan, Jr., Round Rock, TX (US); Yu Wei Sun, Shanghai (CN); John F. Kelley, Polk City, FL (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/018,240

(22) Filed: Jun. 26, 2018

(65) Prior Publication Data

US 2019/0392085 A1    Dec. 26, 2019

(51) Int. Cl.
| | |
|---|---|
| *G06F 16/90* | (2019.01) |
| *G06F 16/904* | (2019.01) |
| *G06F 3/0484* | (2013.01) |
| *G06F 3/0486* | (2013.01) |
| *G06F 16/248* | (2019.01) |

(52) U.S. Cl.
CPC .......... *G06F 16/904* (2019.01); *G06F 3/0486* (2013.01); *G06F 3/04842* (2013.01); *G06F 16/248* (2019.01)

(58) Field of Classification Search
CPC .. G06F 16/904; G06F 16/248; G06F 3/04842; G06F 3/0486
USPC ........................................ 707/705, 706, 758
See application file for complete search history.

(56) References Cited

U.S. PATENT DOCUMENTS

| | | | |
|---|---|---|---|
| 7,925,996 B2 | 4/2011 | Hofmeister et al. | |
| 8,073,868 B2* | 12/2011 | Lavi | G06F 16/9535 |
| | | | 707/779 |
| 9,146,665 B2 | 9/2015 | Gandhi | |
| 9,323,807 B2 | 4/2016 | Werner et al. | |
| 9,652,541 B1* | 5/2017 | Amacker | G06F 3/04817 |
| 2006/0101347 A1* | 5/2006 | Runov | G06F 16/248 |
| | | | 715/764 |
| 2006/0206459 A1 | 9/2006 | MacLaurin | |
| 2009/0164942 A1 | 6/2009 | Laaksonen et al. | |
| 2009/0187842 A1 | 7/2009 | Collins et al. | |

(Continued)

*Primary Examiner* — Hares Jami
(74) *Attorney, Agent, or Firm* — Schmeiser, Olsen & Watts; James Nock

(57) ABSTRACT

A method and system for search exploration in a mobile application environment as well as a desktop environment is provided. The method and system utilize at least one computer processor to perform the steps of selecting a virtual object on a display interface via an indicator positioned within and associated with the virtual object. The computer processor provides dragging the indicator out of a home area and displaying at least one related property associated with the virtual object on the display while dragging outside of the home area. The computer processor provides dragging the indicator onto one or more of the at least one related property associated with the virtual object and a pausing of the indicator over at least one related property causes the computer processor to select the related property as a search parameter of a search query. Dropping the dragged indicator initiates a search based on said search query and the search is initiated based on the search query as a result of said dropping.

20 Claims, 9 Drawing Sheets

(56) References Cited

U.S. PATENT DOCUMENTS

| | | |
|---|---|---|
| 2010/0131881 A1 | 5/2010 | Ganesh |
| 2012/0072869 A1* | 3/2012 | Odagawa ............ H04N 21/4227 |
| | | 715/810 |
| 2012/0096354 A1* | 4/2012 | Park .................. H04M 1/72436 |
| | | 715/719 |
| 2013/0076651 A1* | 3/2013 | Reimann ............... G06F 3/0485 |
| | | 345/173 |
| 2014/0372402 A1* | 12/2014 | Chiu .................... G06F 16/951 |
| | | 707/706 |
| 2015/0046860 A1 | 2/2015 | Sutou et al. |

* cited by examiner

SEARCH EXPLORATION USING DRAG AND DROP

FIELD OF THE INVENTION

The present invention generally relates to graphic user interfaces (GUIs) and, more particularly, to GUIs that facilitate user access to virtual objects through a drag and drop operation of related properties in displays of virtual objects under modern user interface (UI) standards and current graphic design practices.

BACKGROUND OF THE INVENTION

With the explosion of popularity in mobile applications, there is a need to offer a powerful and customizable search system, method and application. This is due to the proliferation of large databases available on the cloud to the general public for searching. The general lack of knowledge about multi-dimensional parameterized and relational data in the available databases, and the layman's lack of familiarity with powerful search techniques such as SQL query syntax, Boolean operators, etc. limits the search options for most users of mobile applications.

While substantial reductions in the cost of data storage and increases in data processing or transfer speed of modern data processors, search engines, communication links and the like has provided the public and various enterprises with easy and rapid access to vast amounts of information, a limitation on efficiency of communication between a data processor or terminal and a user seeking particular information continues to be the ability of a user to assimilate information presented on a usually visual display device, referred to as a graphical user interface (GUI) or, simply user interface (UI). In general, usability of a UI is largely synonymous with "clean" and display of little or minimal and certainly abridged information, much less indicating the scope of available information or indication of how the additional information can be accessed while more information results in increased clutter of the UI. Thus, the UI on most mobile devices is a tradeoff between how much information is needed verses keeping the level of clutter down to allow for a readable screen. The incentive toward decreased clutter of the displayed information is increased by its influence on the user to access information through particular facilities (e.g. particular applications or hardware) and/or resources (e.g. services, databases) that provide comparatively more uncluttered displayed screens.

Further, the recent growth of electronic commerce is likely to provide further incentives toward uncluttered displayed information in the real world or virtual objects is presented in a unitary grouping as a virtual object where the displayed information may convey strong inference of the desirability of the object that is represented. Indeed, at the present time, UIs are typically built on the concept of having users interact with virtual objects in much the same way they would interact with real world objects. For example, lists of so-called e-mail objects or icons or images representing them can represent letters written or printed on paper that could be (and previously were) mailed with a stamp. As a result, user interfaces have been developed to allow access to and interaction with many types of real or virtual objects which have previously been displayed in lists and tables.

However, contemporary UI design standards and accepted practice have moved toward providing more sparse interfaces or images and emphasizing the nature of data records that parallel and represent existing real or virtual objects.

Currently popular UI virtual object designs use so-called pictured lists containing some type of graphic illustration and a listing or summary of only the properties of the object that are considered to be most important or most often of interest that more closely resembles an annotated photograph than a table. The chosen format often resembles a business card, both in layout and content. For example, in a modern list for music, the pictured list would contain, for a particular real-world object, a picture of an album cover for a recording, the title of the album, the artist and the cost while much more information may be available (e.g. media on which the music is available, performance duration, technical data, production personnel, music type or category, date(s) of recording/performance, reviews and commentary and the like.

As a result of the trend toward more graphical portrayals of objects by UIs, many of the strengths and facilities of lists and tables such as easy filtering and sorting and locating of other objects having one or more desirable properties in common with a given object have been greatly de-emphasized and access to information which may be available has been made much more difficult by the use of the so-called pictured lists alluded to above.

Recently, there has been a population shift toward simple mobile applications. This trend calls for an intuitive visual search paradigm that can offer powerful actions without sacrificing simplicity.

SUMMARY OF THE INVENTION

A method and system for search exploration in a mobile (or non-mobile) application environment is provided. The method and system utilize at least one computer processor to perform the steps of selecting a virtual object on a display interface via an indicator positioned within and associated with the virtual object. The computer processor provides dragging the indicator out of a home area and displaying at least one related property associated with the virtual object on the display while dragging outside of the home area. The computer processor provides dragging the indicator onto one or more of the at least one related property associated with the virtual object and a pausing of the indicator over at least one related property causes the computer processor to select the related property as a search parameter of a search query. Dropping the dragged indicator initiates a search based on said search query and the search is initiated based on the search query as a result of said dropping. With this method and system, it is easier for the user to search with general visual cues rather than predicting specific words that would effectively narrow a specific search.

BRIEF DESCRIPTION OF THE DRAWINGS

The foregoing and other objects, aspects and advantages will be better understood from the following detailed description of various embodiments of the invention with reference to the drawings, in which.

DETAILED DESCRIPTION OF EMBODIMENTS OF THE INVENTION

Figures 1, 2:
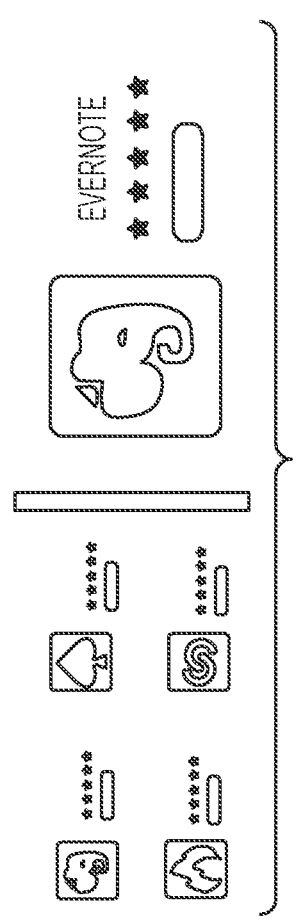
FIG. 1 is an illustration of an exemplary traditional table forming a user interface.
FIG. 2 is an exemplary display of a pictured list (or portion thereof) and a magnified item contained in the pictured list.

In the world of mobile applications, one user interface (UI) object can have many different relationships to other objects and those objects can have a relation to other objects and properties. This fact raises several issues. Conventional active memory systems do not recall the rich complexities of the different relationships between UI objects. Also, mobile devices have limited input techniques and are not well suited for complex expressions. These issues limit the design options.

For example, if a user wants to search for how a specific email is related to all of the user's text messages on the user's mobile device. And, if the user wants only to include in the search only text messages sent by the user on a certain date, then the search expression is difficult to complete via drag and drop techniques currently available. Only those users who know logical expressions would be able to complete a complex command if that function were available.

The present invention proposes a method, system and program that allows users using mobile devices to both explore and create complex search expressions via a simplified exploration technique. The user does not have to remember any relationship(s) between a series of objects and properties, nor does the user have to understand any logical expressions. The user can move in a non-linear direction as the user explores the complex relations between many search objects and properties.

It will be appreciated that the invention will improve computer functionality by generating complicated search queries based on a virtual object and its related properties and sub-properties to obtain a user-generated search query without the need to type out the elements of the search query. For example, if a user is browsing an e-mail contacts list or calendar entries for a name that is not easily remembered, but is known to be in a particular location (or have some other property in common therewith), a related object corresponding to another person known to be in another location (or share another property with the person of interest) can be used to access a variety of properties (or other common property) to obtain a short list of related objects and/or properties for a search query, from which a choice can be made. Further, the methodology of the invention actively involves the user in generating the "filter by property" action while the UI is at all times cleaner and more easily assimilated by the user, particularly in comparison with drop down menus or dialog boxes while much more efficiently utilizing UI display area.

Computing devices that use non-traditional methods, such as drag and drop, to interact with data are becoming more popular than those that use keyboard-based interaction. The present invention characterizes these differences and show how today's query representation and evaluation techniques are not well-suited to these new non-keyboard devices. The present invention proposes a method and system that can be built using existing components.

The present invention does not focus on the interface between the UI and the database (i.e., a database architecture) as in the prior art. Instead, the present invention focuses on how the UI would work in order to support a simple and intuitive search method.

The present invention considers three requirements to be important to a successful alternative: (1) query specification through direct manipulation of results, (2) the ability to view and modify any part of the current query without departing from the direct manipulation interface, and (3) SQL-like expressiveness. The present invention presents a unique visual query system to meet all three requirements in a single design.

The present disclosure focuses on the UI rather than the database architecture. An advantage of the present invention is that it uses direct manipulation of icons, drag and drop, and simple selections. The present invention is not reliant on a keyboard and/or is a keyboard-free method to perform a search.

FIG. 1 is an illustration of an exemplary traditional table forming a user interface. Referring now to the drawings, and more particularly to FIG. 1, there is shown a traditional table as presented to a user on a user interface (UI) display. This format for a user interface display image was extremely popular until about 2010 and continues to be used for spreadsheet displays and the like. It is to be understood that this table is arranged for facilitating conveyance of an understanding of the invention and the relationship of such a format to UI display formats that are currently gaining in popularity and no portion thereof is admitted to be prior art in regard to the present invention. FIG. 1 is thus considered "Related Art".

The solid line rectangle overlaid on FIG. 1 represents a row, the entirety of which is associated with and represents a given object. The dashed line rectangles overlaid on FIG. 1 represent columns and a given column will typically correspond to a particular (somewhat generalized) property of respective objects which correspond to each other across the plurality of objects represented. For clarity, it is understood that an object is, for example, a contact (as shown), a file, an image, a computer in a network, etc. as well as other data that is represented by an image. A property is what is known about or related to an object, such as its attributes; i.e., name, color, physical condition like weight, last saved condition, size, file type, etc. Conventionally, in a table the rows designate the objects and the columns designate the properties of those objects. Most objects in a system are represented by the UI, but there are some objects in a system that are never externalized to an end user. Unless the context indicates otherwise, the terms "object" and "property", whether singular or plural, are used herein in the expansive sense in which they are understood in object oriented programming in which an object will be of a specified type, can represent any entity and may possess any number of properties, including properties possessed through inheritance.) The generalized name of each property or object is typically displayed at the top of each column as a fixed row of the display for user reference. For example, the name of an object traditionally displayed in the first or left-most column (which may also be displayed in a fixed format, for reference) is the primary property by which the object is known and the somewhat generalized properties displayed at the top of each column are basically corresponding categories or types of properties of the collection of objects. The indicia displayed at each intersection of a row and a column represent the text (if any) of a field in a data entry in a data record that may form part of a database. The number of objects/rows and columns/properties is arbitrary and the table image can generally be panned (e.g. moved horizontally) and/or scrolled (e.g. moved vertically) to provide visibility of any data contained in the table even when the extent of the table, generated at a size sufficient for legibility, substantially exceeds UI screen dimensions. For example, if the data is the information contained in a database of the data processing equipment which is interoperable in an enterprise, there may be hundreds of objects and the properties associated with each object/computer (e.g. processor type, clock speed, memory capacity of each type of memory or memory device, peripherals, security provisions, available applications and processing capabilities and the like) can be quite numerous, as well. Other tables or lists may be hierarchically nested below each column and row intersection to allow the user to "drill down" to view underlying data, comments, notes, and metadata that support the text at a given row/column intersection. Often in UIs, a user drills down into properties, typically called settings, details or information.

FIG. 2 is an exemplary display of a pictured list (or portion thereof) and a magnified item contained in the pictured list. Referring now to FIG. 2, which is also considered "Related Art" for the reasons discussed above in connection with FIG. 1, an exemplary pictured list (also known in the art by many other terms as well as being exemplary of other types of lists or collections) that is of a type enjoying increased popularity at the present time is illustrated for contrast with FIG. 1. In the particular pictured list illustrated in FIG. 2 the left side contains a display of four virtual objects forming the pictured list, itself, and the right side displays a magnified image of a selected one of the virtual objects included in the pictured list displayed on the left. Information included in the magnified image is very limited but is also contained in the corresponding virtual object in the pictured list in which the information is typically too small to be legible but the object can still be recognized and selected at will in accordance with the "thumbnail" graphic image included therein. Typical properties for an arbitrary commercially available object selected for inclusion within the respective virtual object displays will be, for example, an image, application name, application type, rating and type or mechanism of purchase although many more types of properties may be available. Due to the limitation of information provided in this type of image, no sorting capability is generally provided and, at best, only a detached "filter by" function is typically provided.

It should be appreciated that a knowledgeable and physical user interaction with the interface is required even to achieve legibility the small amount of information provided. Therefore, it is clear that while the interface image of FIG. 2 emphasizes the relationship of information to specific virtual objects representing other (e.g. real world) objects and the displayed image is visually appealing, engaging and quickly assimilated than that of FIG. 1, more numerous physical user operations are required even for rudimentary levels of use while some information potentially of interest is made unavailable or accessible only with substantial mental attention and consumption of user time and both physical and mental effort.

Figure 3:
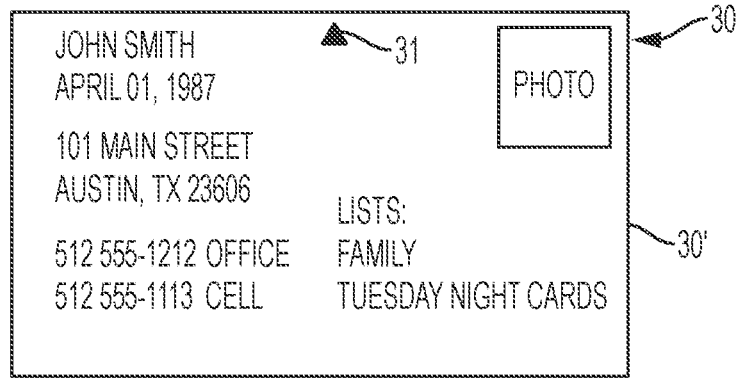
FIG. 3 illustrates an exemplary virtual object in the form of a contact in business card format.

FIG. 3 illustrates an exemplary virtual object in the form of a contact in business or personal card format in the context of an email application.

The invention, as will now be described in detail below, provides a simple and limited set of intuitive operations the user can easily employ to obtain access to other virtual objects or pictured lists and access other information to the level that it may exist in the entire data base. The number of steps required is also very limited for convenience of the user and to shorten the time required for the user to access the information of interest as will now be described with reference to FIG. 3. Specifically, as shown in FIG. 3, an image 30 of an original virtual object that the user has accessed is shown as a contact stored in the database. A comparison of this image in FIG. 3 with the enlarged virtual object image 30 of FIG. 2 reveals that a similar graphic image and comparable limited number of text items reflecting properties are displayed. However, an icon 31 of arbitrary shape, size and location and any other desired visual attributes (e.g. color) is displayed within the boundary of the virtual object image. A triangular solid image of the icon 31 is chosen for simplicity of illustration in this particular depiction. No legend or instruction to the user is necessary or appropriate since, as will be described below, the icon will have several different functionalities depending on context or the phase or step of utilization which will be appropriately invoked by similar and possibly continuous user interaction with the icon in each case. While it is beneficial for simplicity and utilization of interface image area that only a single virtual object image be displayed, the display of additional information or virtual object images is unimportant to the operation or practice of the invention and can be provided, if desired. On the other hand, it is also considered to be desirable to provide for dragging the icon 31 or virtual object 30 (e.g. by user interaction with some other area of the virtual object) to any desired location on the interface display area and to provide for other images invoked in the course of operation of the invention to be overlaid over any other interface images or information that may be present. Both of these capabilities are common and well-known in the graphical or visual design arts as well as the visual display arts.

Figure 4:
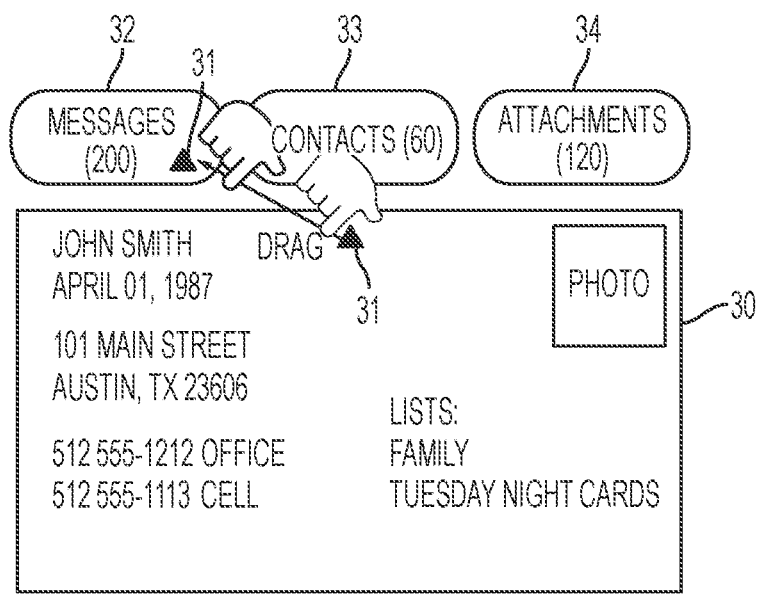
FIG. 4 is an illustration of exemplary user actions utilized in operation of the invention by a user and the displays of related objects invoked thereby.

Referring to FIG. 3, the original object, which is a contact, 30 is displayed and a triangle 31 (which could be any symbol) is dragged to generate the search properties or search selections 32, 33, 34 in FIG. 4. FIG. 4 is an illustration of exemplary user actions utilized in operation of the invention by a user and the displays of related properties invoked thereby. The triangle 31 is held (dragged, not dropped) throughout the entire search process. In one embodiment, dragging occurs by clicking a single mouse button or by a user placing a finger on the icon 31 and moving the icon 31. Selection is created when the user pauses for a predetermine time period over a specific choice from the search selections. The act of dropping (i.e., releasing) the triangle 31 concludes the search specifications and initiates the search process.

Any modern, commercialized, operating system designed for end users allows for icons to be dragged as described above. Within operating systems, most items one sees (e.g., drop downs, pushbuttons, visuals, icons, etc) are now objects that the operating system generates. While most are fixed, objects can be created that can be moved from one area of the screen to the next—typically a person skilled in the art calls them icons. These are the type of objects that the triangle in the above example represents.

To begin use of the invention to access additional or alternative information, the user first selects the icon 31 using any known cursor manipulation technique or hardware such as but not limited to a mouse, stylus sensing or finger touch on a touch-panel display and dragging the icon to a different location. It is beneficial that any movement of the icon, however slight, be detected but that some location tolerance be provided for a return of the icon to its original location in the virtual object image, in the event the user decides to reverse the invocation of the invention. Movement of the icon 31 outside the boundary or home area 30' of the virtual object image; e.g., contact 30 in FIG. 3, is also considered to be a suitable criterion for invocation of the invention and in such a case, the invocation can be reversed by returning the icon within the virtual object image boundary, regardless of location within that boundary or home area 30'. For clarity, the home area 30' in this example is defined by the boundary of the contact 30 illustrated by a rectangular box. It will be understood by those of skill in the art that various type of boundaries or home areas 30' may be defined for a particular application or virtual object.

Upon such a movement of icon 31, a second step of providing an image referred to herein as search properties 32, 33, 34 are displayed, preferably at a location and in a shape or area which does not significantly overlie the original virtual object area since a potential ambiguity of control might result. As illustrated, the search properties 32, 33, 34 contain a series of valid properties in any convenient or desired format of all of the types of property data for which a value is specified in the data in a data record for the original virtual object 30 or, alternatively, for all types of property data specified in other comparable data records of the data base. These types of data correspond to the property data types that would be displayed as fixed column headings as alluded to above in connection with the tabular display of FIG. 1. The user can then simply continue to drag the icon 31 to or on top of a selected search property 32, 33, 34 or re-select/acquire the icon and drag it to the desired location/property data type. When the location of the icon coincides with the location of a displayed search property 32, 33, 34, that property data type is determined to have been selected, either automatically and immediately, as is desired or required, or in response to an additional selection action of the cursor control facility or mechanism such as a mouse click or touch-screen gesture.

In other words, when the triangle 31 is dragged out of the contact 30, the valid properties 32, 33, 34 for this contact 30 appear. In this example, they are the messages 32, contacts, 33, and attachments 34. See FIG. 4. The user can either pause with the triangle 31 over the messages 32, pause with the triangle over the contacts 33, pause with the triangle 31 over the attachments 33, or drag the triangle 31 back to the contact of anywhere else the three properties 32, 33, 34 do not exist and drop it to cancel the operation.

Figure 5:
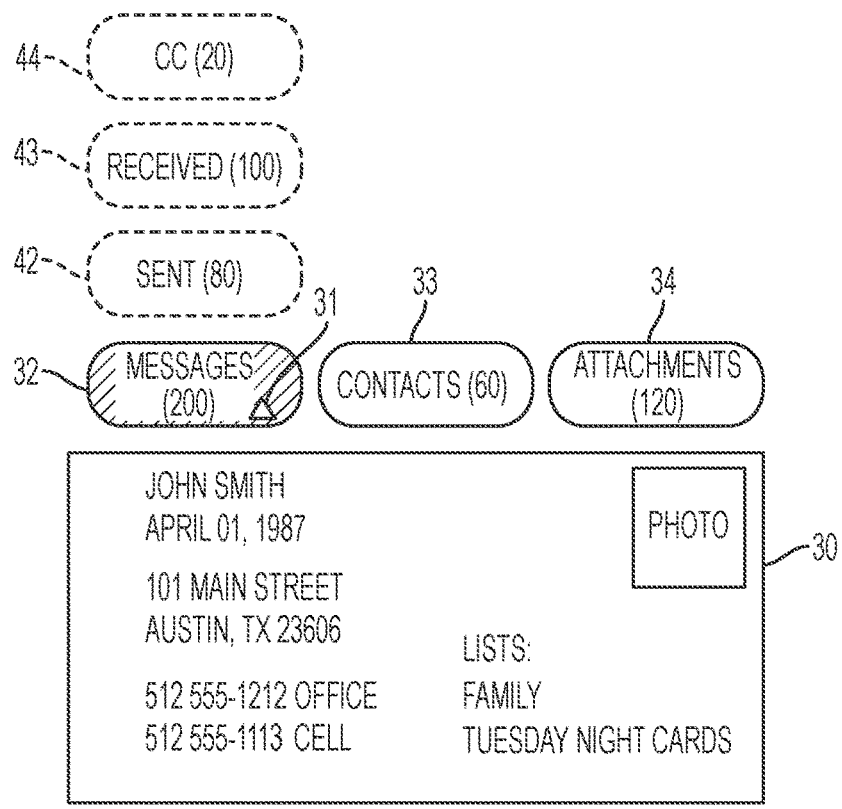
FIG. 5 is an illustration of exemplary user actions utilized in operation of the invention by a user and the displays of sub-properties for the related property; i.e., the Messages property.

FIG. 5 is an illustration of exemplary user actions utilized in operation of the invention by a user and the displays of sub-properties for the related property; i.e., the Messages object. When the user pauses over a valid property 32, 33, 34 for a predetermined period of time, then that property is selected and then then any further related sub-properties for each object 32, 33, 34 are displayed. In this example, the user pauses the triangle 31 over the message object 32 as illustrated in FIG. 5. After the pause, the property either displays any related sub-properties that are available. For example, FIG. 5 illustrates an example of these sub-properties; e.g., "Sent" sub-property 42, "Received" sub-property 43, and "CC" sub-property 44 in FIG. 5.

Figure 6:
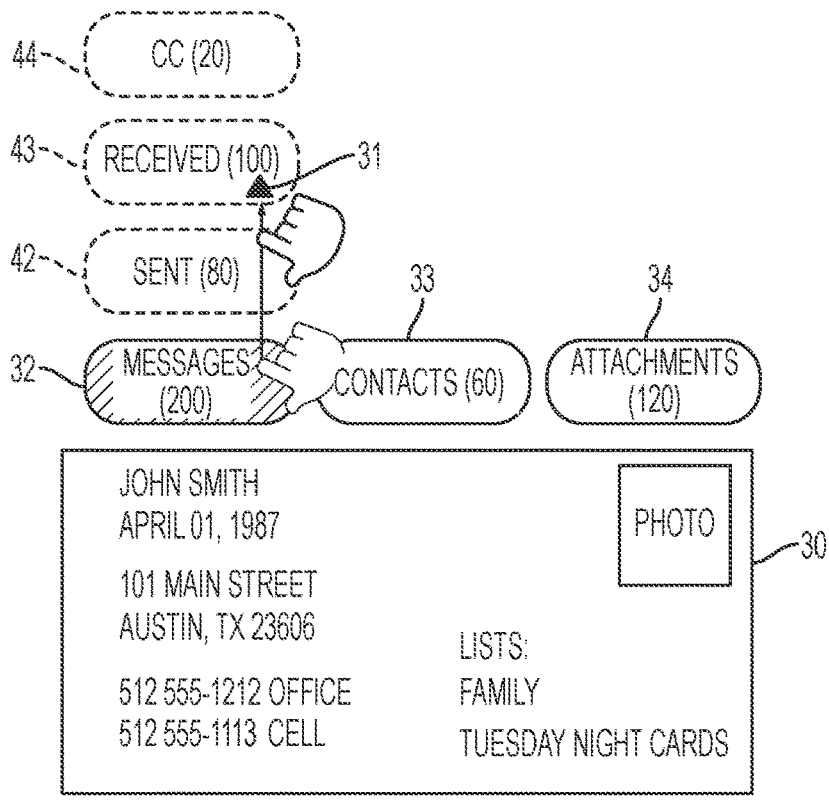
FIG. 6 is an illustration of exemplary user actions utilized in operation of the invention by a user as the user moves the icon over a sub-property; i.e., received sub-property, and the displays invoked thereby.

FIG. 6 is an illustration of exemplary user actions utilized in operation of the invention by a user as the user moves the icon over a sub-property; i.e., Received sub-property, and the displays invoked thereby. With reference to FIG. 6, the user drags the triangle 31 over the Received sub-property 43 to indicate that the user wants to search the messages that have been received and having a relation to the data of the virtual object 30. It is noted that the user in this example has not released or dropped the icon 31 at any point in this example. The act of dropping will occur later in this example as described below.

The search creation of FIGS. 3-6 may continue until either the user is satisfied with the selected search properties (i.e., properties 32, 33, 34 and sub-properties 42, 43, 44) or until the search properties and sub-properties have been exhausted. By exhausted, the invention encompasses a situation where there are no further sub-properties to a specific property and all appropriate selections have been made.

Figure 7:
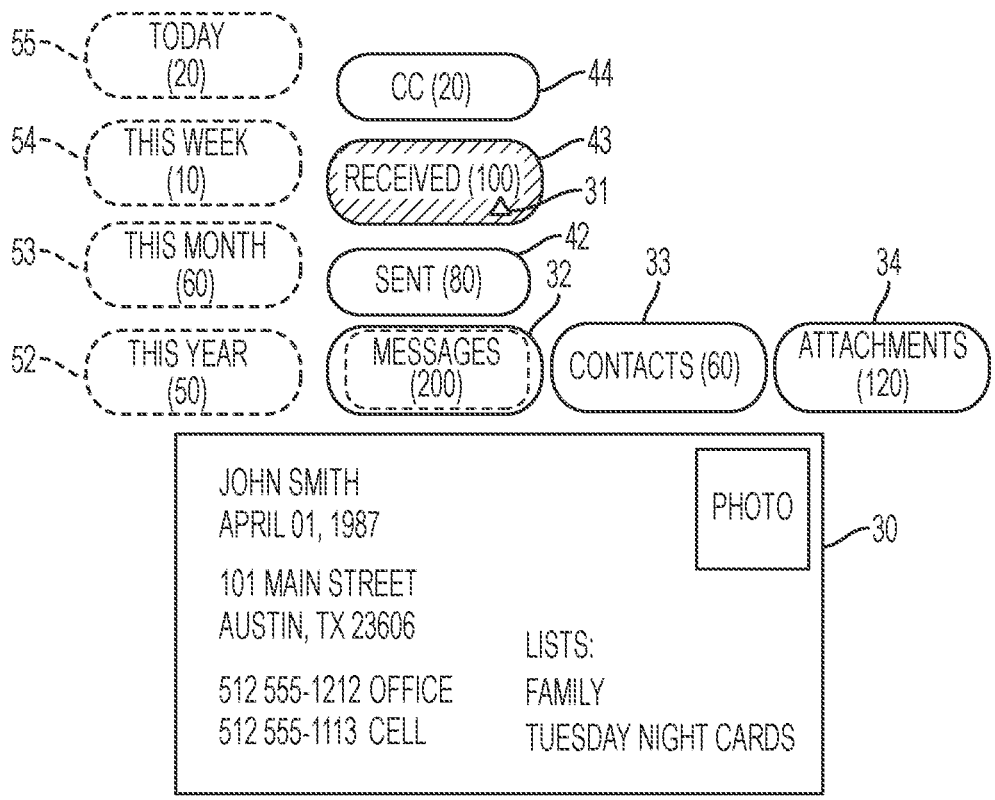
FIG. 7 is an illustration of exemplary user actions utilized in operation of the invention by a user as the user moves the icon over a sub-property; i.e., received sub-object, and the displays of further sub-properties, i.e. days, weeks, months, etc., invoked thereby.

FIG. 7 is an illustration of exemplary user actions utilized in operation of the invention by a user as the user moves the icon over a sub-property; i.e., Received sub-property, and the displays of further sub-properties, i.e. days, weeks, months, etc., invoked thereby. In FIG. 7, it is illustrated that the received sub-property 43 has four (4) further sub-properties 52, 53, 54, 55 which in this example are received messages dated today 55, this week 54, this month 53, and this year 52.

Figure 8:
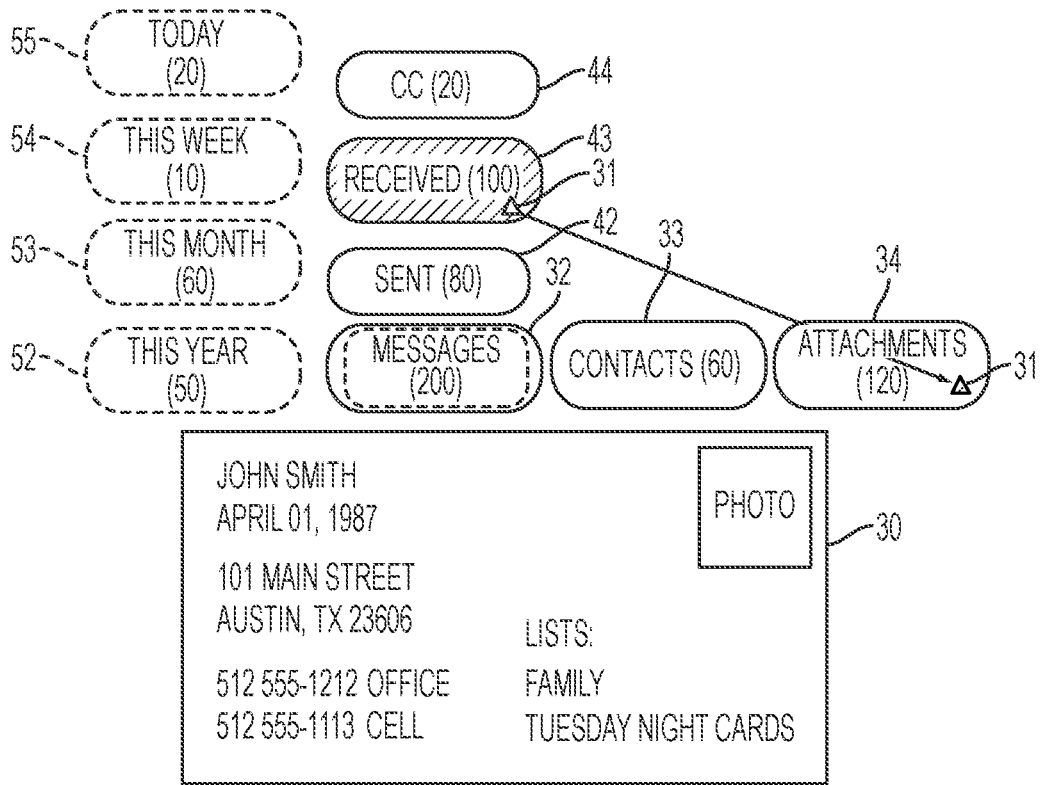
FIG. 8 is an illustration of exemplary user actions utilized in operation of the invention by a user as the user moves the icon over another property; i.e., Attachments, and the displays invoked thereby.

FIG. 8 is an illustration of exemplary user actions utilized in operation of the invention by a user as the user moves the icon over another property; i.e., Attachments, and the displays invoked thereby. To further emphasize how a user may explore further search options, FIG. 8 illustrates an arrangement where the user now drags the triangle 31 from the received property 43 to the "Attachments" property 34. The search expression that is produced is to search for emails of this type in the list of massages that have been received and have attachments is illustrated in FIG. 8 as highlighted properties "Messages" 32, "Received" 43, and "Attachments" 34 (see FIG. 9).

Figure 9:
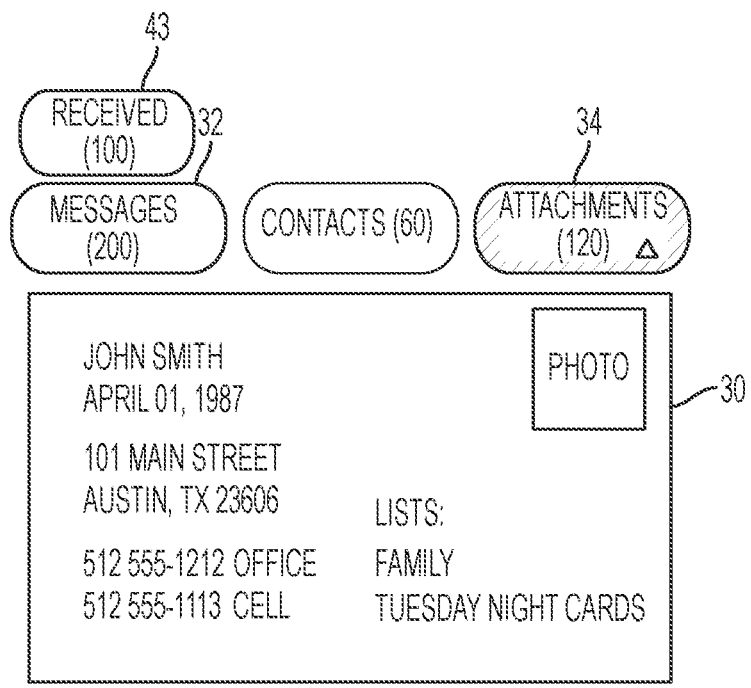
FIG. 9 is an illustration of exemplary user actions utilized in operation of the invention by a user as the user moves the icon over the property; i.e., Attachment, and the displays invoked by highlighting the objects Messages and Attachment as well as the sub-property Received which form the basis of a search query.

FIG. 9 is an illustration of exemplary user actions utilized in operation of the invention by a user as the user moves the icon over the property; i.e., Attachment, and the displays invoked by highlighting the properties Messages and Attachment as well as the sub-property Received which form the basis of a search query. The exploration for search properties 32, 33, 34, 42, 43, 44, 52, 53, 54, 55 could continue for the type of attachments 34 or contacts 33 or could return back to messages 32. FIG. 9 illustrates an arrangement where a user has selected the message, received and attachments properties 32, 34, 43 prior to initiating the search request. When the user is ready to tell the application to begin the specified search, the user releases the triangle 31 (for the first time) and that action triggers the "perform the search now" function after which the search results are displayed in a conventional manner.

Alternatively, if the icon is dropped and the virtual object 30 is displayed but the user wishes to reverse the invocation of the invention, it can be provided that dropping of the cursor control device on any area outside the virtual object dismiss the virtual object 30 and return the drag icon to its original location. Such a control function would be desirable if the user did not see a property type of interest in the search object image. In such a case, the user may seek an information type of interest by switching to another virtual object and virtual object image that may include data for the property type of interest.

However, it should be appreciated that the search properties 32, 33, 34 can accommodate many more property types than the pictured list or even columns of the tabular UI of FIG. 1 without incurring substantial additional effort in panning the tabular interface. Typically, tabular (non-spreadsheet) interfaces are limited to four to twelve columns by the text length of the property type names (which must be displayed in a horizontal row of the table) whereas the search properties 32, 33, 34 are in the nature of a list and only limited to the number of text lines that can be accommodated on the UI screen. Up to fifty property types (approaching the scale of many spreadsheets) aligned in a single column can usually be accommodated without scrolling. Of course, multiple columns may also be provided in the ghost template. Therefore, such an action to dismiss a search property should become more rare with larger databases collecting more types of properties but such an operation may remain useful for correcting user errors in operating the invention.

When it is determined that a selection of the appropriate properties and sub-properties is compete, a third phase or step of the process of simplified and facilitated of a customized search query is begun by displaying an animation of highlighted properties and sub-properties of the selected type. As illustrated in FIG. 9, for example, the properties, illustrated as highlighted at messages 32, received 43, and attachments 34 represent the search query items related to the virtual object 30 and selected by the user to form the search query. The user may then reacquire and drag or simply continue to drag the icon to a particular desired properties and sub-properties which causes the properties and sub-properties to be highlighted to confirm the correspondence of the drag icon location with a particular displayed instance as illustrated in FIG. 9. Selection of a property or sub-property can be performed in numerous ways such as a mouse click, touch-screen gesture or the like but it is beneficial that selection be performed by dropping the drag icon on the displayed instance to be selected. Thus, the completion of user input to select a new virtual object coincides with the completion of a (possibly interrupted but potentially continuous) drag-and-drop action by the user; further enhancing the intuitive nature of the operation of the invention and providing enhanced computer functionality of the user interface by provide a single-step operation to select multiple objects and sub-objects in one operation.

Then, as the fourth step of operation of the described embodiment of the invention, the selected and highlighted properties and sub-properties that form the elements of the search query are submitted to the appropriate application to perform the customized search initiated by the user. This facility would normally be provided as a function of the host system rather than the invention but the possible interaction of the invention and the host system at this point is regarded as a perfecting feature of the invention but is not necessary to the successful practice of the invention in accordance with its basic principles.

While not required for the successful practice of the invention but as a further perfecting feature thereof, particularly where a provision is made for dropping the icon onto the selected property, it is beneficial that this action be displayed with animation such as moving the selected and highlighted instance information across the interface display area to the desired or specified original location along a straight or curvilinear path over a perceptible period of time. This may be accomplished in many ways which will be apparent to those skilled in the art such as duplicating the image area of the selected and highlighted instance information and moving that image area in the horizontal and vertical directions by a fraction of the distance to the desired final location in the original object image or another location at a different "Selected Object" location at time-separated intervals such as the frame refresh rate or some small multiple thereof. It is considered that this animation conveys a better sense of completion of the operation of the invention (subsequent to the final user action required for selection) to provide the desired random access to information that may not otherwise be visible in the object image to thereby improve the computer functionality of the user interface in the same way that a self-referential table for a computer database or lip synchronization to facial expression may enhance a computers functionality. As a practical matter, the duration of the animation provides time for the system to fetch the remainder of related object information for the virtual object image 30.

Of course, consistent with currently standard use of abbreviated pictured lists and virtual object formats currently favored, the virtual object developed through use of the invention will generally contain information of only the most often desired types and usually far less than all properties possessed by the selected object that the virtual object represents. Other property types and property instances can be accessed by further drag icon manipulation. For example, if a user wished to confirm that a newly selected virtual object also possesses one or more other properties of interest, the selection of a property in further sequence of operations as described above could be provided with an intermediate step for showing the property or sub-property of a particular type of property possessed by the currently selected virtual object. Such a facility could be provided in any of several ways such as displaying the particular sub-property for a highlighted object during a short delay before determining a property selection to have been made. During this delay, the user could move the drag icon to additional objects (with the delay being reset when a highlighted property type is changed) to review the respective properties prior to display of all properties of a selected property type. Alternatively, instead of a delay, a "show all" option could be provided in the display of the particular property or the "show all" function could be performed in response to a cursor control action such as a double-click with a mouse or a corresponding touch-screen gesture. While such a function is regarded as yet another possible perfecting feature of the invention, it may also provide for reducing the frequency of database queries for all instance of a property type across the entire database and thus reduce the processing burden of operation of the invention.

Referring now to the flow chart of FIG. 10, the operation of the invention will be discussed in connection therewith. It may be helpful to the understanding of some beneficial or perfecting features of the invention that may be less than fully evident from FIG. 10 to refer to the state diagram of FIG. 11 and the architecture represented by the block diagram of FIG. 12 during this discussion and the following description of some features of the invention will be directly referred to in this discussion. While FIGS. 11 and 12 will be discussed in detail below, some parenthetical reference numbers will be provided in the following discussion of FIG. 10 to facilitate reference thereto. In general, the state diagram may more clearly depict the particular actions of the user to which the invention desirably responds. It should be understood that the depictions of various elements on FIG. 12 are simply exemplary and schematic depictions that could be employed to support the functions of the invention and that other equivalent expedients and functional elements will be apparent to those skilled in the art or, preferably, be formed from portions of a general purpose data processor by suitable programming to establish particular structural elements having the desired functions.

Figure 10:
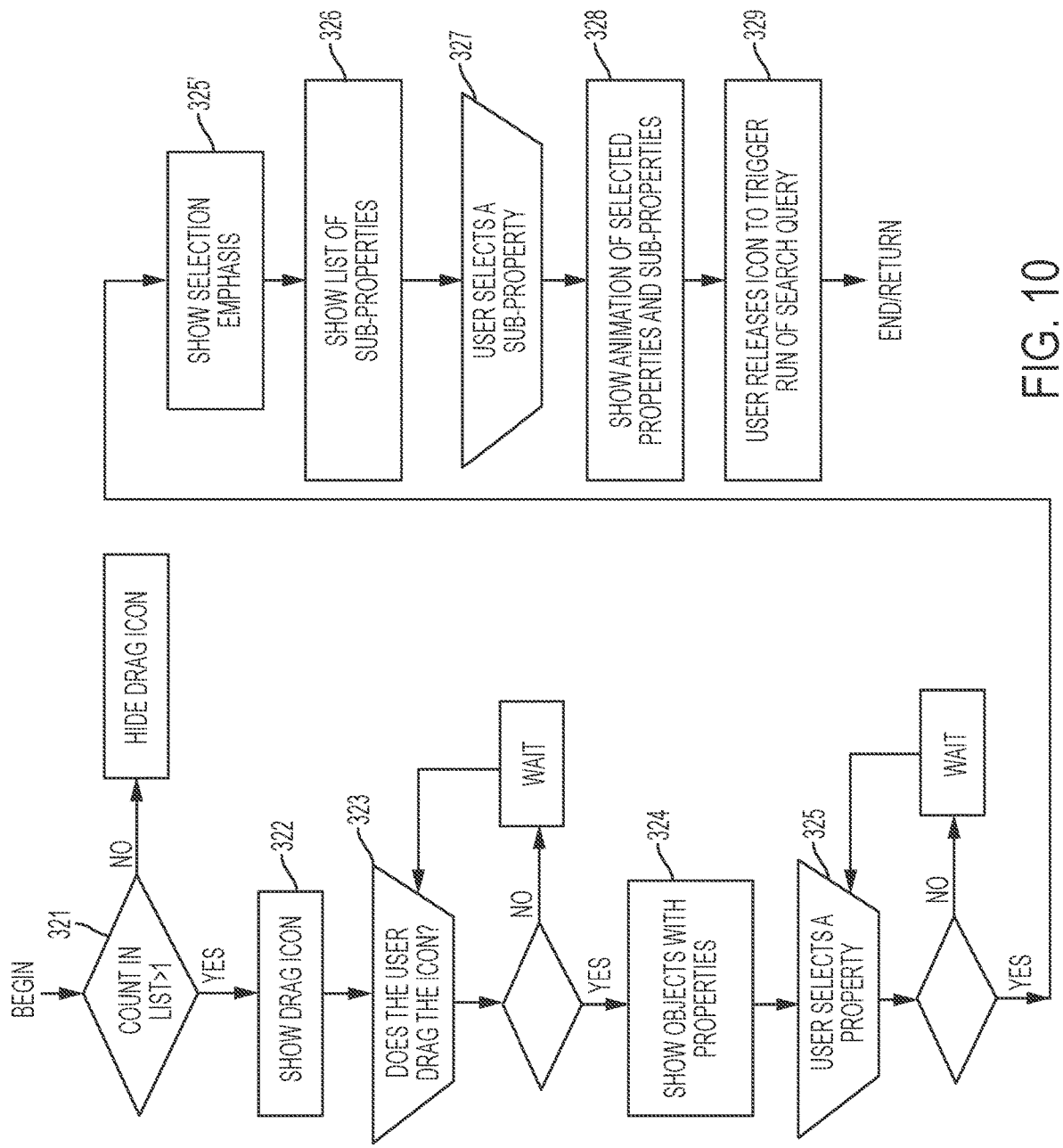
FIG. 10 is a flow chart of operations performed by the invention in the course of its use to locate a desired property and sub-property relates to the original virtual object.

FIG. 10 is a flow chart of operations performed by the invention in the course of its use to locate a desired properties and sub-properties relates to the original virtual object. As depicted in FIG. 10, the operation of the invention begins at some arbitrary point in some user interaction with the overall data processing system to retrieve some data which the user desires and it is assumed that some data (which may or may not be the data desired by the user) has been retrieved. It should be kept in mind that the basic function of the invention is to enable the user to have random access to any and all objects and properties known to the system; which access might have been provided in the past by exhaustive data in a tabular format, and to facilitate browsing, sorting and filtering functions that may be compromised in complexity or directness of access by recently disclosed formats and display images of virtual objects. Therefore, the process depicted in FIG. 10 starts with the word "Begin" to denote the invocation of the processes which the invention facilitates, even as compared with a known display format or a keyboard typing format.

As alluded to above, it is assumed that some data has been retrieved by earlier manipulations of the system by the user such as conducting a database query or the like in a manner entirely independent of the operation of the invention. These manipulations may return only a single record or virtual object or a plurality thereof. For example, the user may open a contact (See FIG. 3) or an email, an attachment, a calendar date, a note, etc. Since operation of the invention is simplified in regard to a single returned data record (since sorting or filtering may be performed on properties already displayed if the single returned virtual object is not the information of interest), an initial operation 321 (331 of FIG. 11) is performed to determine if only one or more than one record has been returned and, if only one record is involved, the icon by which the invention is operated is hidden (331' of FIG. 11) in the virtual object display and the process of the invention is not invoked. However, if more than one record or virtual object has been returned it/they will be displayed with an arbitrary icon or symbol displayed at an arbitrary location in regard to the location of the virtual object image(s). it is beneficial that the icon be displayed at a consistent location (specified at 351 of FIG. 12), preferably centralized and within the border of the virtual object, as illustrated at 31 of FIG. 3. Thus, the visibility of the icon (sometimes referred to herein as a "drag icon" in view of the nature of the user's interaction with it) serves to indicate to the user that the invention is available for facilitating additional data processing operations. The icon 31 can be displayed on only a selected and enlarged virtual object image or may be displayed on each or selected ones of the virtual objects displayed in the pictured list. The icon can also be used to select a virtual object from the pictured list to be displayed in a larger virtual object format. It is beneficial that the choice between operation from either or both of a pictured list and/or a magnified virtual object may be concurrently provided together with the capability of a user to freely switch between such types of display formats or concurrently display them and to select virtual object images from the pictured list to be displayed in an enlarged virtual object format as shown at 332 and 333 of FIG. 11.

Figure 11:
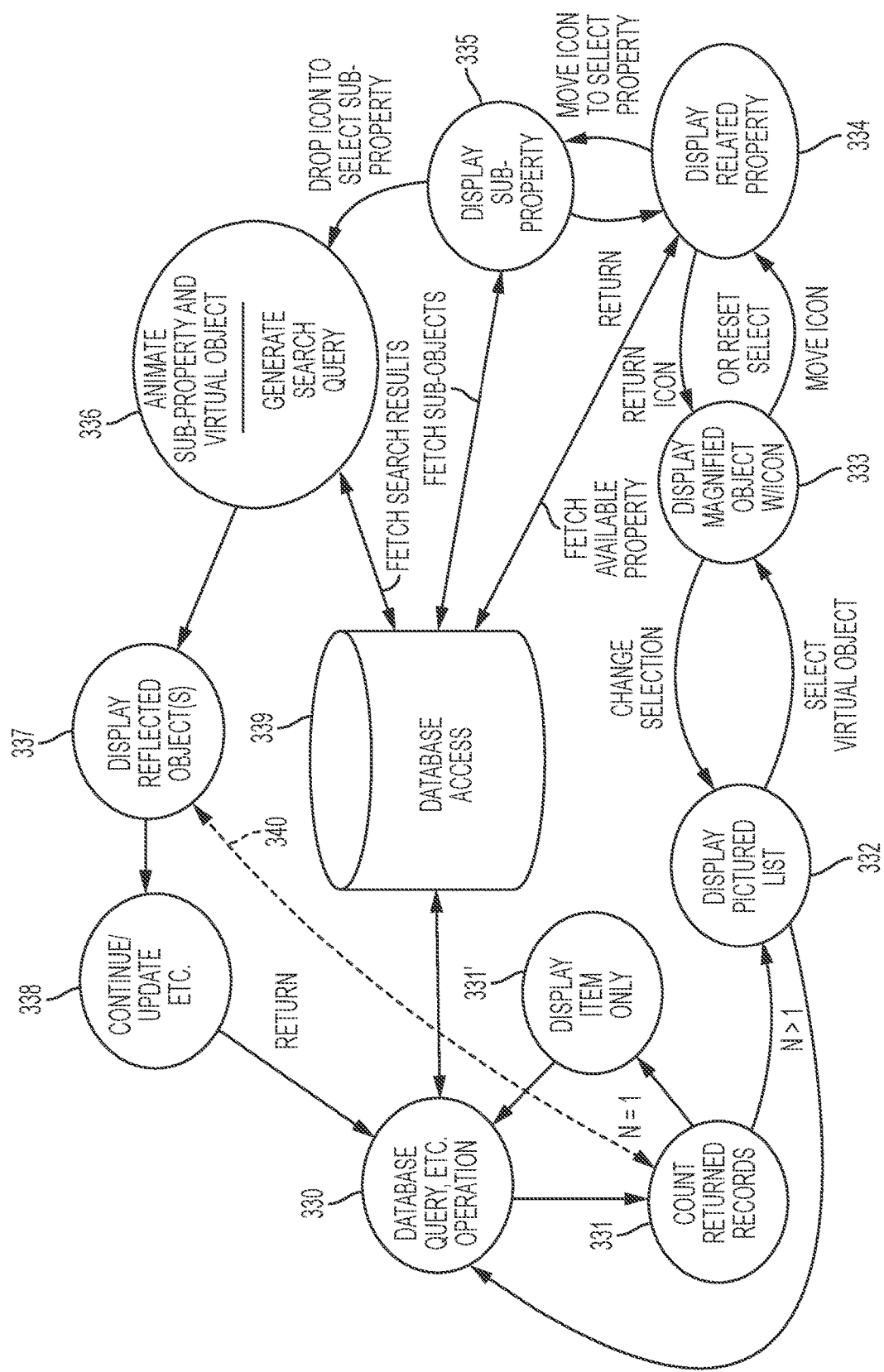
FIG. 11 is a state diagram illustrating operation of the invention in response to user interaction in connection with a user interface.
Figure 12:
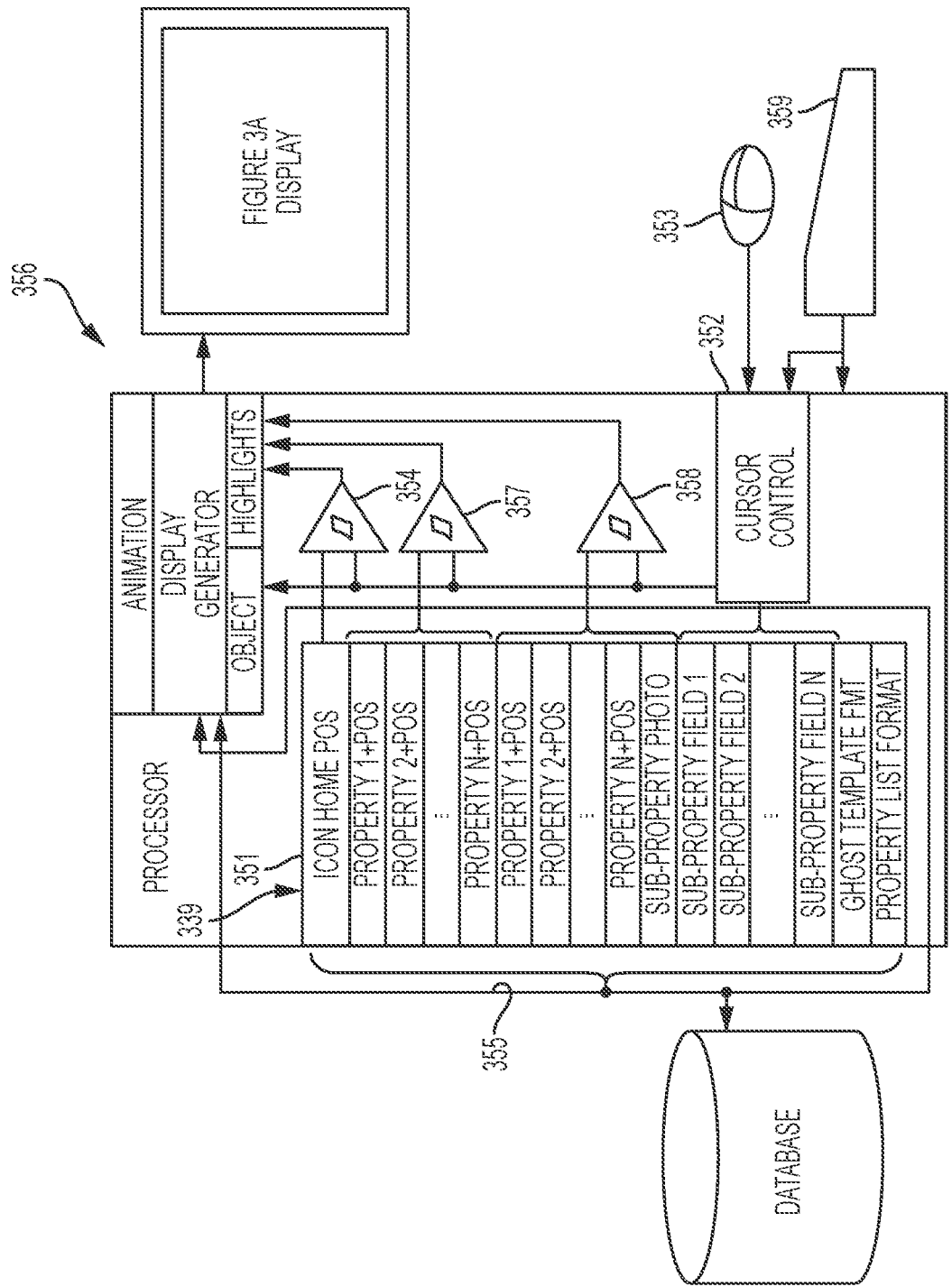
FIG. 12 is a block diagram of the functional elements in accordance with an embodiment of the invention.

FIG. 11 is a state diagram illustrating operation of the invention in response to user interaction in connection with a user interface. If the icon is displayed and the facility of the invention is available, it is determined if the user drags the icon as shown at step 323 and state 333 of FIG. 11 while in a wait state that continuously or periodically returns to state 323 until dragging of the icon occurs. FIG. 12 is a block diagram of the functional elements in accordance with an embodiment of the invention. When dragging of the icon is detected, which can be accomplished by comparison of the icon "home" position 351 (FIG. 12) and the position specified by cursor control 352 using a mouse 353 using a comparator 354 (preferably having a degree of positional tolerance) or some other expedient that will be apparent to those skilled in the display art. In response to such a detection of dragging of the icon outside of the home area 30', a series of properties is displayed in accordance with a format stored in and fetched from memory 339 as shown at state 334 of FIG. 11 (which includes an access operation of memory 339) is displayed by controlling the display generator 356 to display Property 1-Property N information (which can be panned or scrolled if properties are more numerous than can be legibly displayed in the areas available or desired for the virtual object) delivered with corresponding display position data for each property over connection 355. This state essentially provides a list of properties 32, 33, 34 for which data entries have been made for the object and its representation by the current virtual object 30. The user can then continue or resume dragging of the drag icon to a property and/or property in a list formed by the virtual object to select a property as shown at 325 (also including a wait loop) and state 335 or return the icon to its original position to return to state 333 from which a virtual object selection can be changed at state 332 and the process resumed with the new selection. This feature for dragging and populating a property and sub-property list providing further improved computer functionality by enabling a user to access related properties in a convenient and semi-automatic manner as described herein.

Preferably, when the icon 31 is moved to a particular displayed property as determined by comparator 357 but before a selection is made by pausing the icon 31, the text of the property is displayed with an attribute such as highlighting and the display attribute changed such as underline, boldface characters or color change when a selection is made by the user as illustrated at 325' of FIG. 5.

When the icon 31 has moved outside the home area 30', a list of properties 32, 33, 34 (e.g. a listing of all related properties of the selected virtual or original object 30) is displayed as shown at 325' in much the same manner as the original object 30 as described above with the text and position information being fetched from memory 339 along with property list or related property list 32, 33, 34. Panning and/or scrolling of the property list is considered possible, particularly since the number of related properties may be very large even after objects with identical text are removed. While it is possible to provide for the original object 30 to be deleted from the display at this point, it is considered preferable to maintain it on the display or interface to allow the user to return to it as shown as a return to state 334 in FIG. 11 by, for example, dragging the icon outside the related object list. The user can drag the icon through the related object display or list with alteration of the display attributes of the displayed text as the icon is dragged or hovers over each entry as detected by comparator 358 to improve computer functionality by reducing user-required input and automatically generating search query criteria. Selection 337 of an object 32, 33, 34 or sub-object 42, 43, 44 can then be made by pausing the icon 31 on the displayed property or sub-property. The selected property is then displayed as shown at 336, preferably by animation of moving its position to the corresponding position on the original virtual object or a related property as alluded to above with or without further alteration of the display. Animation can also be applied as desired to the replacement of other property text values and/or graphical portrayals of the related properties as shown in FIG. 4. From this point, the user may resume operations such as updating, or by acting upon the newly selected property with the actions provided by the system for that type of property as shown at state 338, after which any other operation by the user may be performed as shown by return of the state to 330.

It should be appreciated from FIG. 11 that the invention provides a sequence of states that provide additional functions and memory accesses that cannot be specified or otherwise accessed from a pictured list of related properties or virtual object of modern design in which only the information which is of interest most frequently is displayed. This sequence of states always returns to the state from which the process in accordance with the invention is entered to enhance the user's experience and functional results. Moreover, states 332-335 also provide for return to their previous states and sequentially to state 330 if the user does not perceive the results of any of these states to be progressing toward the result of interest and/or to reverse inadvertent or erroneous operation of the invention at any point before state 336 is reached (at which point, state 330 can be reached most expeditiously by continuing from the customized search query). The system may further provide the ability to remove previously selected properties and sub-properties prior to initiating a search by suitable means such as double-clicking a mouse or inclusion of a remove button or suitable finger manipulation as known to those of skill in the art.

It should also be appreciated from FIG. 12 that the functionality of the invention to provide random, (e.g. content addressable) access to properties and objects in the system requires only that the most rudimentary of functional elements be developed by particular configuring of the processor to provided registers or specification of memory locations to store the text and display location of properties and instances and respective comparators to detect cursor movement that can be performed with, for example, a mouse 353, keyboard 359, touchscreen 360 gesture or the like, to or away from particular interface display locations. Therefore, the invention can be easily implemented in a small amount of software or hardware or a combination thereof, while at the same time dramatically improving the computer's functionality and enhancing the user's experience with generating search queries in a convenient and effective manner.

Thus, in summary of FIGS. 10-12, the basic operations and user interactions in accordance with the invention are a.) show a virtual object resulting from an action provided by the host system, b.) show all property types and sub-properties for which data has been provided for the property, c.) select a property type or sub-property, d.) show all properties an sub-properties related to the virtual object, d.) select a property or sub-property, e.) display the selected property and sub-property corresponding to the selected virtual object, f.) select a search query based on the selected property and sub-property, and g.) display the corresponding selected properties and sub-properties that form the search query at the same or a different UI location as the original virtual object. Through the use of the invention, the user has been provided with efficient and intuitive access to any arbitrary information that may be contained in a database, providing effectively random access in a manner consistent with current display formats for virtual objects (e.g. having reduced information content) and without cluttering the screen or increase of difficulty in assimilating information displayed on a UI by presenting categories of choices in a logical and hierarchical and intuitive fashion which serves to facilitate assimilation and user interaction.

It should also be appreciated that the invention will improve computer functionality by generating complicated search queries based on a virtual object and its related properties and sub-properties as alluded to above to obtain a user-generated search query without the need to type out the elements of the search query. For example, if a user is browsing an e-mail contacts list for a name that is not accurately remembered but is known to be in a particular location (or have some other property in common therewith), a related object corresponding to another person known to be in another location (or share another property with the person of interest) can be used to access a variety of properties (or other common property) to obtain a short list of related objects and/or properties for a search query, from which a choice can be made. Conceptually and in the context of a tabular UI such as that of FIG. 1 with objects vertically arranged and properties horizontally arranged, the user could scan across the properties at the tops of columns to find a property that is likely to be in common with the object of interest and then scanning vertically through the list with only that property in the list of related objects. with either the tabular UI or a virtual object image, the basic function is that of filtering related objects and sub-objects in accordance with the invention and listing of objects of a particular type of property is more intuitive and immediate. Further, although the effect is more subtle, the methodology of the invention actively involves the user in generating the "filter by property" action while the UI is at all times cleaner and more easily assimilated by the user, particularly in comparison with drop down menus or dialog boxes while much more efficiently utilizing UI display area.

In view of the foregoing, it is clearly seen that the invention can greatly facilitate random and plenary access to the entirety of a set of data in a database while accommodating the display of virtual objects of modern graphic design which are likely to omit any indication of what may be an extensive collection of data and does not require listing of data in tables from which assimilation by a user is far less than optimal. Moreover, the facility and functionality of the invention is well adapted to be easily and quickly controlled by a user and can be completely traversed in a single drag (e.g. from home position to an object list entry) and drop (e.g. on selected object or sub-object) operation of any type of cursor control although continuity of the dragging operation is not required. Further, the lists of the properties and the sub-properties are far more easily and quickly assimilated by a user than perusal of and selection from a table or by keyboard input since only data associated with a small number of hierarchical selections are presented and the number of hierarchical selections that are provided is not limited in any way. For example, states 333 and 334 of FIG. 11 could be replicated to allow, for example, selection among a plurality of databases or additional replications of state 335 to permit access to object data by sub-groups or categories to any desired level of granularity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
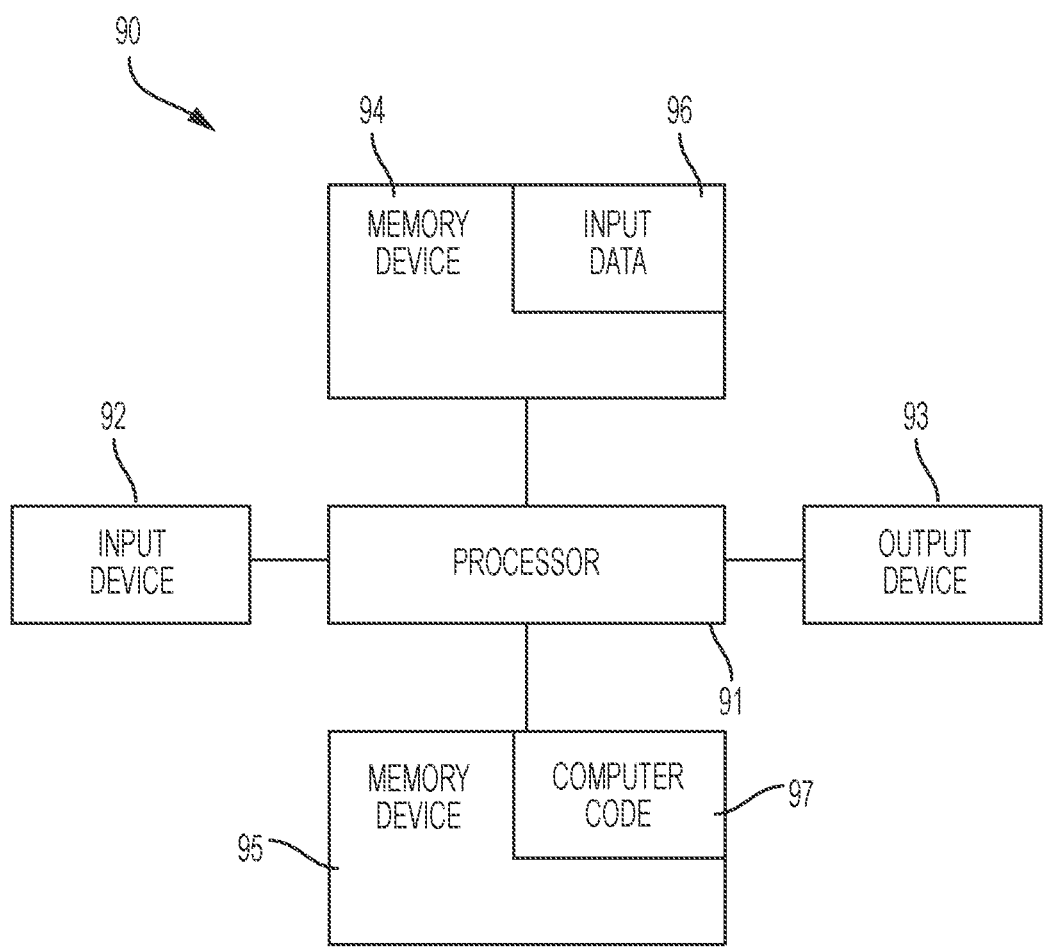
FIG. 13 additionally illustrates an exemplary computer system used for implementing the methods of the present invention.

FIG. 13 additionally illustrates an exemplary computer system used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a touch screen, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 13) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 13 shows the computer system 90 as a particular configuration of hardware and software, any configuration of hardware and software, as would be known to a person of ordinary skill in the art, may be utilized for the purposes stated supra in conjunction with the particular computer system 90. For example, the memory devices 94 and 95 may be portions of a single memory device rather than separate memory devices.

While the invention has been described in terms of various embodiments, those skilled in the art will recognize that the invention can be practiced with modification within the spirit and scope of the appended claims.

What is claimed is:

1. A method for first time initiation of search exploration in a mobile or non-mobile application environment without departing from a direct manipulation interface of the mobile or non-mobile application environment, said method comprising:
   receiving a user selection of a virtual object image on a display interface via an indicator positioned within and associated with the virtual object;
   monitoring a first dragging of the indicator out of a home area by the user;
   displaying at least one related property associated with the virtual object on the display in response to the first dragging of the indicator out of said home area by the user, wherein the at least one related property associated with the virtual object is not displayed prior to the first dragging of the indicator out of the home area by the user;
   monitoring a second dragging of the indicator onto one or more of the at least one related property associated with the virtual object by the user;
   monitoring a pausing of said indicator over said at least one related property by the user to thereby select said related property as a search parameter of a search query;
   identifying a dropping of the dragged indicator by the user; and
   performing a first time initiation of the search based on said search query as a result of said dropping, and without requiring further user action, wherein the search query comprises only the selected virtual object and the at least one related property selected as the search parameter.

2. The method as recited in claim 1, further comprising:
   prior to identifying the dropping, monitoring a third dragging of the indicator out of a second home area defined by the selected at least one related property to thereby display at least one additional sub-property on the display associated with the selected at least one related property,
   monitoring a fourth dragging of the indicator onto at least one of the at least one additional sub-property, and
   monitoring a second pausing of said indicator over said at least one of the additional sub-property to thereby select said additional sub-property as an additional search parameter of said search query prior to said identifying the dropping,
   wherein the search query comprises only the selected virtual object, the search parameter, and the additional search parameter.

3. The method as recited in claim 1, wherein said at least one related property is a set of properties that contains less than all properties of said virtual object.

4. The method as recited in claim 1, wherein said virtual object is selected from a pictured list or other type of list or collection.

5. The method as recited in claim 1, including a further step of highlighting said related property that the dragged indicator has been dragged onto.

6. The method as recited in claim 2, wherein said virtual object remains displayed when said related property and said sub-property are displayed.

7. The method as recited in claim 1, wherein said virtual object remains displayed when said selected at least one related property is displayed.

8. The method as recited in claim 1, wherein said selected at least one related property is delivered to a search engine to perform a search based on said search query.

9. The method as recited in claim 1, wherein said at least one related property is a property of said virtual object.

10. The method as recited in claim 1, wherein said indicator is a drag icon.

11. The method as recited in claim 10, wherein the first and second dragging are performed in a continuous drag and drop operation of said indicator.

12. A computer program product comprising:
a computer readable storage medium; and
a computer readable program code stored in the computer readable storage medium, the computer readable program code containing instructions executable by a processor of a computer system to implement a method for first time initiation of search exploration in a mobile or non-mobile application environment without departing from a direct manipulation interface of the mobile or non-mobile application environment, the method comprising:
displaying a drag icon in association with a virtual object;
displaying a plurality of properties in response to a first dragging of said drag icon outside of a home area defined by said virtual object, said plurality of properties including property types for which data is stored for said virtual object, wherein the plurality of properties are not displayed prior to the first dragging of the drag icon outside of the home area;
selecting at least one of said properties in response to a pausing of said drag icon over said at least one of said plurality of properties for a predetermined period of time to define at least one selected property;
displaying said at least one selected property; and
performing a first time initiation of a search in response to a dropping of said drag icon, and without requiring further user action, said search being based only on said virtual object and said at least one selected property.

13. The method as recited in claim 12, further comprising:
prior to dropping, displaying at least one additional sub-property associated with the at least one selected property in response to a second dragging of the drag icon out of a second home area defined by the at least one selected property; and
adding at least one additional sub-property as an additional search parameter to said search query prior to said dropping in response to a pausing of the drag icon onto said at least one additional sub-property.

14. The method as recited in claim 12, wherein said virtual object contains less than all properties of said virtual object.

15. The method as recited in claim 12, wherein said virtual object is selected from a pictured list.

16. The method as recited in claim 12, including a further step of highlighting said at least one selected property that the dragged drag icon has been dragged onto.

17. The method as recited in claim 13, wherein said virtual object remains displayed when said plurality of properties and said at least one additional sub-property are displayed.

18. The method as recited in claim 12, wherein said virtual object remains displayed when said plurality of properties are displayed.

19. A computer system, the computer system comprising:
a processor, wherein the processor is configured to perform a method for first time initiation of search exploration, the method comprising:
receiving a user selection of a virtual object on a display interface via an indicator positioned within and associated with the virtual object;
monitoring a first dragging of the indicator out of a home area by the user;
displaying at least one related property associated with the virtual object on the display in response to the first dragging of the indicator out of said home area by the user, wherein the at least one related property associated with the virtual object is not displayed prior to the first dragging of the indicator out of the home area by the user;
monitoring a second dragging of the indicator onto one or more of the at least one related property associated with the virtual object by the user;
monitoring a pausing of said indicator over said at least one related property by the user to thereby select said related property as a search parameter of a search query;
identifying a dropping of the dragged indicator by the user; and
performing a first time initiation of the search based on said search query as a result of said dropping, and without requiring further user action, wherein the search query comprises only the selected virtual object and at least one related property selected as the search parameter.

20. The system as recited in claim 19, further comprising the steps of:
prior to identifying the dropping, monitoring a third dragging of the indicator out of a second home area defined by the selected at least one related property to thereby display at least one additional sub-property on the display associated with the selected at least one related property,
monitoring a fourth dragging of the indicator onto at least one additional sub-property, and
monitoring a second pausing of said indicator over said at least one additional sub-property to thereby select said additional sub-property as an additional search parameter of said search query prior to said identifying of the dropping,
wherein the search query comprises only the selected virtual object, the search parameter, and the additional search parameter.

* * * * *